United States Patent
Chang et al.

(10) Patent No.: US 7,336,568 B2
(45) Date of Patent: Feb. 26, 2008

(54) METHOD AND APPARATUS FOR LONG SEEKING CONTROL IN AN OPTICAL DISC DRIVE

(75) Inventors: Hung-Hsiang Chang, Taipei Haien (TW); Te-Wang Tseng, I-Lan Hsien (TW)

(73) Assignee: Mediatek Incorporation, Hsin-Chu Hsien (TW)

( * ) Notice: Subject to any disclaimer, the term of this patent is extended or adjusted under 35 U.S.C. 154(b) by 399 days.

(21) Appl. No.: 10/711,739

(22) Filed: Oct. 1, 2004

(65) Prior Publication Data

US 2005/0073919 A1   Apr. 7, 2005

(30) Foreign Application Priority Data

Oct. 2, 2003   (TW) .............................. 92127340 A

(51) Int. Cl.
*G11B 7/00*   (2006.01)
(52) U.S. Cl. ................. 369/44.28; 369/30.13; 369/30.15
(58) Field of Classification Search ............ None
See application file for complete search history.

(56) References Cited

U.S. PATENT DOCUMENTS 6,154,424 A   11/2000   Kao et al.
6,606,282 B2   8/2003   Hung et al.
6,606,283 B2   8/2003   Chan
6,785,197 B2 *   8/2004   Chao et al. ............... 369/30.15
2002/0101792 A1 *   8/2002   Chao et al. ............... 369/30.13
2002/0196715 A1 *   12/2002   Hung et al. ............... 369/30.16
2003/0031097 A1 *   2/2003   Chan ........................ 369/30.15
2003/0099166 A1 *   5/2003   Chan et al. ............... 369/30.17

FOREIGN PATENT DOCUMENTS

CN   1229246 A   9/1999
CN   1392544 A   1/2003

* cited by examiner

*Primary Examiner*—Wayne Young
*Assistant Examiner*—Van T. Pham
(74) *Attorney, Agent, or Firm*—Winston Hsu

(57) ABSTRACT

A method for controlling long seeking operation in an optical disc drive is provided. The optical disc drive includes a sled actuator, a pickup head installed on the sled actuator for reading and/or writing data in an optical disc, and a controller for controlling the sled actuator to move together with the pickup head. The method includes the steps of (a) receiving remaining tracks information indicating a number of tracks remained to be crossed by the sled actuator and/or the pickup head; (b) receiving velocity information indicating a velocity of the sled actuator and/or the pickup head; (c) receiving acceleration information indicating an acceleration of the sled actuator and/or the pickup head; (d) driving the sled actuator to move according to the remaining tracks information, the velocity information, and the acceleration information.

14 Claims, 3 Drawing Sheets

METHOD AND APPARATUS FOR LONG SEEKING CONTROL IN AN OPTICAL DISC DRIVE

BACKGROUND OF THE INVENTION

1. Field of the Invention

The invention relates to a method for long seeking control, and more particularly, to a method for long seeking control employing adaptive control to a sled actuator by referring to the remaining tracks information indicating a number of tracks to be crossed, and the movement information of the sled actuator.

2. Description of the Prior Art

Pickup head control is important in an optical disc device. Control on radial movement includes static tracking, short seeking, and long seeking (also known as long jumping). Some methods and related system structures of long seeking are disclosed in Taiwan Published Patent No.479248, No.514893 and U.S. Pat. No. 6,606,283 "Long seeking method used in an optical disc drive", etc.

Various approaches for long seeking have been proposed. For example, (1) using a stepping motor where the position of a pickup head could be determined according to a signal provided by the stepping motor, and the operating of a long seeking control is done according to the position of the pickup head, (2) controlling the pickup head by an open loop (that is, without feedback control), (3) generating a velocity profile according to the number of tracks remained to be crossed, receiving velocity information of the pickup head according to tracking signals, and controlling the pickup head by comparing the velocity profile and the received velocity information in manner of velocity feedback.

The first approach requires a stepping motor, which is more expensive than a sled actuator which only requires direct current (DC) to control. Therefore the first method is less desirable. As for the second approach, since the electrical/mechanical variances between different optical disc drives generally exist, an open loop control is generally not precise enough as required. Therefore, the third method is comparatively more preferable.

FIG. 1 illustrates a block diagram of a conventional optical disc drive 100 for accessing (that is, reading and/or writing) information on an optical disc 120. The optical disc drive 100 includes a spindle motor 110, a sled actuator 130, and a pickup head 140. The pickup head 140 is movably installed on the sled actuator 130 for accessing data on the optical disc 120. An object lens 150 is installed on the pickup head 140 for guiding a laser beam generated by the pickup head 140 toward the optical disc 120. The sled actuator 130 carries the pickup head 140 for radial movement along a direction parallel to the surface of the optical disc 120. In general, it is called long seeking when the pickup head moves over several thousand tracks (for example, 20,000 tracks for CD or 30,000 for DVD).

FIG. 2 illustrates a long seeking control system 200 of the optical disc drive 100. The velocity profile is predetermined to indicate the relation between the desired pickup head velocity (v) and the remaining tracks (t). The number of remaining tracks is the number of tracks remained to be crossed in the long seeking operation, and therefore equal to the distance between the current position (where the pickup head currently located) and the destination position. First, the number of remaining tracks is provided, and then a controller 210 generates a driving voltage according to the velocity profile and the velocity information of the sled actuator 130 to control the movement of the sled actuator 130 (and also the pickup head 140 contained therein). A velocity sensor 220 provides the velocity information of the pickup head 140 according to the tracking signals generated during the movement of the pickup head 140.

Ideally, when the numbers of remaining tracks are the same, each optical disc drive incorporating the same controller should be able to drive the pickup head to move in the same velocity. However, this is not the case because the optical disc drives generally vary in their mechanical/electrical characteristics. For example, the friction inside each optical disc drive may be different. Also, there is a friction difference between situations when the sled actuator moves in the inner radius of the optical disc or in the outer radius of the optical disc. Therefore, it is not practical to expect that a fixed velocity profile would perfectly fit all situations in all optical disc drives. Moreover in the prior art, feedback control depends on the velocity information (or sometimes also depends on the number of remaining tracks), which is also not precise enough for long seeking control.

SUMMARY OF THE INVENTION

It is therefore an objective of the claimed invention to provide a method for long seeking control employing adaptive control to a sled actuator by referring to remaining tracks, velocity information and acceleration information of the sled actuator.

Briefly, the present invention provides a method for controlling long seeking operation in an optical disc drive. The optical disc drive includes a sled actuator, a pickup head installed on the sled actuator for accessing data on an optical disc, and a controller for controlling the sled actuator to move together with the pickup head. The method comprises: receiving remaining tracks information indicating a number of tracks remained to be crossed by the sled actuator and/or the pickup head; receiving velocity information indicating a velocity of the sled actuator and/or the pickup head; receiving acceleration information indicating an acceleration of the sled actuator and/or the pickup head; and driving the sled actuator to move according to the remaining tracks information, the velocity information, and the acceleration information.

The present invention further provides a long seeking control system in an optical disc drive. The optical disc drive includes a sled actuator, a pickup head installed on the sled actuator for accessing data on an optical disc, and a controller for controlling the movement of the sled actuator together with the pickup head. The long seeking control system comprises: a track sensor coupled to the controller for providing remaining tracks information indicating a number of tracks remained to be crossed by the sled actuator and/or the pickup head; a velocity sensor coupled to the controller for providing velocity information indicating a velocity of the sled actuator and/or the pickup head; and an acceleration sensor coupled to the controller for providing acceleration information indicating an acceleration of the sled actuator and/or the pickup head. An characteristic of the long seeking control system of the present invention is that the controller controls the movement of the sled actuator according to the remaining tracks information, the velocity information, and the acceleration information adaptively.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
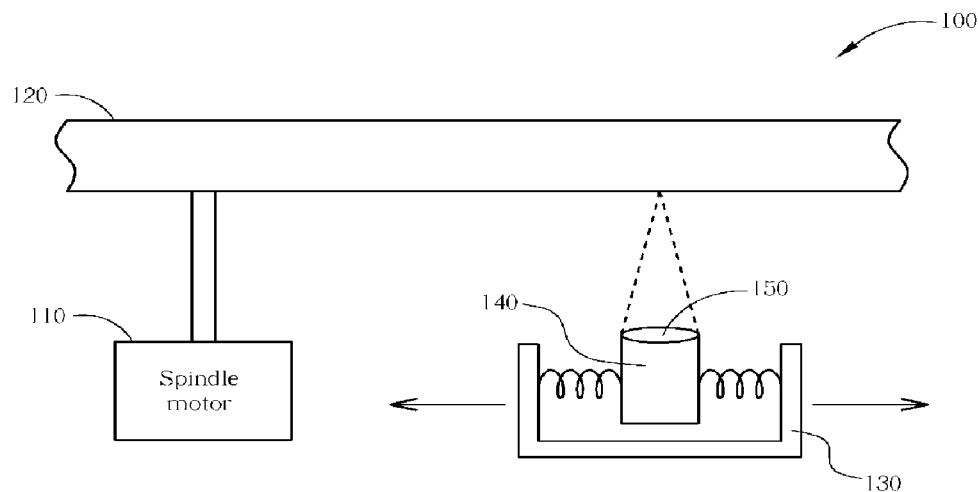
FIG. 1 is a block diagram of a conventional optical disc drive.
Figure 2:
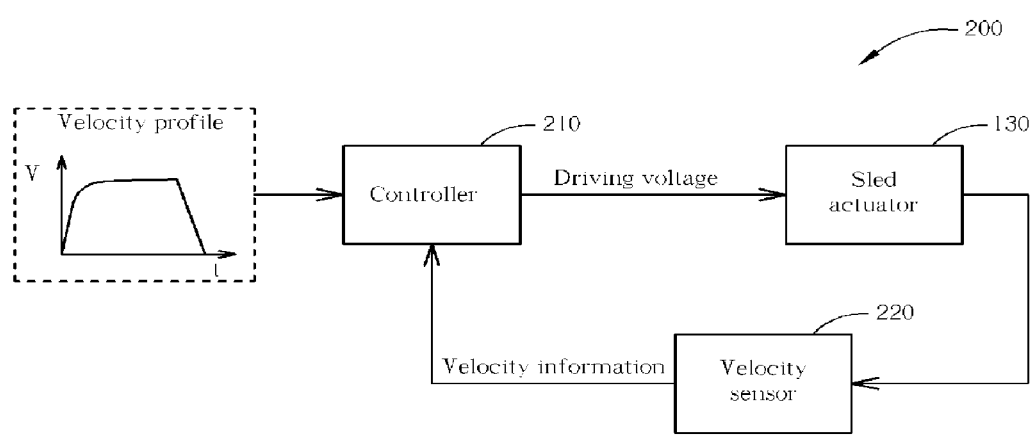
FIG. 2 illustrates a long seeking control system of the conventional optical disc drive.
Figure 3:
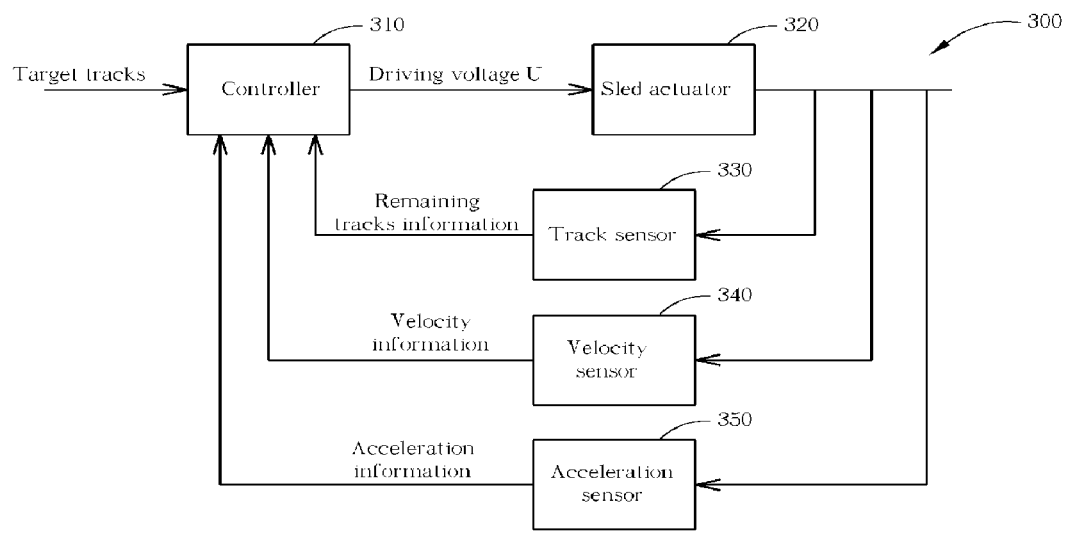
FIG. 3 is a block diagram of a long seeking control system according to an embodiment of the present invention.

FIG. 3 illustrates a block diagram of a long seeking control system according to one embodiment of the present invention. The long seeking control system 300 includes a controller 310 for receiving target tracks information, a sled actuator 320 for receiving a driving voltage U and moving accordingly, a track sensor 330 for providing remaining tracks information (indicating a number of tracks, T, remained to be crossed by the sled actuator 320 and/or a pickup head set on the sled actuator 320), a velocity sensor 340 for providing velocity information (indicating a velocity V of the sled actuator 320 and/or the pickup), and an acceleration sensor 350 for providing acceleration information (indicating an acceleration A of the sled actuator 320 and/or the pickup head). The pickup head (not shown) is movably installed on the sled actuator 320 for accessing data on an optical disc (not shown). The controller 310 generates the driving voltage U to drive the sled actuator according to the target tracks information, the remaining tracks information (i.e. the number T), the velocity information (i.e. the velocity V), and the acceleration information (i.e. the acceleration A). The target tracks information indicates the number of tracks between the starting position and the destination position of the pickup head, indicates the number of tracks to be crossed during the overall long seeking operation, and therefore is fixed during one single long seeking operation. The remaining tracks information indicates the number of tracks (T) remained to be crossed during the long seeking operation, indicates the distance between the current position (where the pickup head currently located) and the destination position, and therefore changes during the long seeking operation.

The embodiment does not require a velocity profile as in the prior art. Instead, in a first stage the controller 310 receives the target tracks and outputs an initial driving voltage $U_0$ to the sled actuator 320 so as to control the initial movement of the sled actuator 320. In this first stage the system 300 is operating in an open loop mode. When the sled actuator 320 starts to move, the system enters a second stage and becomes operating in a close loop mode. In the second stage the driving voltage U is provided by the controller 310 according to the number T, the velocity V and the acceleration A, which are provided by the track sensor 330, the velocity sensor 340 and the acceleration sensor 350 respectively.

Figure 5:
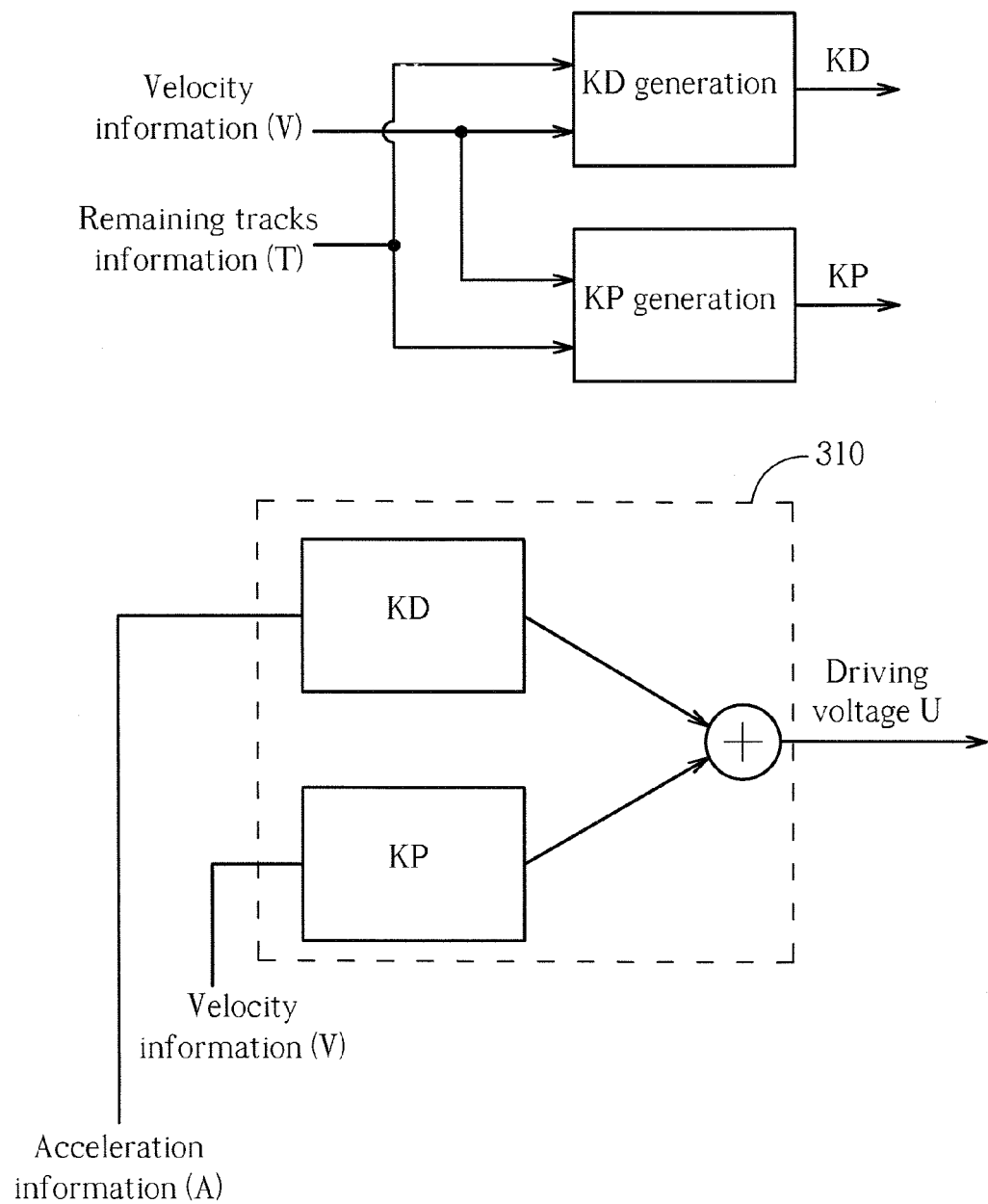
FIG. 5 is a block diagram of illustrating the component influenced of the driving voltage by the velocity of the sled actuator and/or the pickup head being the product of the velocity and a first multiplier KP, and the component influenced by the acceleration of the sled actuator and/or the pickup head being the product of the acceleration and a second multiplier KD.

Further, in the embodiment shown in FIG. 3, the driving voltage U is a function of the velocity V and the acceleration A. In the driving voltage U, the component influenced by the velocity V is the product of the velocity V and a first multiplier KP, and the component influenced by the acceleration A is the product of the acceleration A and a second multiplier KD, which is shown in FIG. 5 according to the following equation:

$$U = KP \times V + KD \times A \qquad \text{equation 1}$$

The first multiplier KP is a variable determined by the number T and the velocity V. The second multiplier KD is also a variable determined by the number T and the velocity V. Therefore, the long seeking control in this embodiment is an adaptive PD (proportional differential) control. Thus, in long seeking, the control on the sled actuator 320 adaptively varies according to the number T and the velocity V.

In this embodiment, two illustrative approaches for determining the first multiplier KP and the second multiplier KD according to the number T and the velocity V are disclosed. The first approach is to establish a lookup table of the number T and the velocity V in contrast to the first multiplier KP and the second multiplier KD, and the lookup table is available to the controller 310. The controller 310 could generate corresponding first multipliers KP and second multipliers KD according to different number T and velocity V by referring to the lookup table. The second approach utilizes polynomials and performs calculation to obtain the first and second multipliers. The controller 310 receives the remaining tracks information and the velocity information from the track sensor 330 and the velocity sensor 340 respectively, and performs calculation to obtain the first multiplier KP and the second multiplier KD.

In this embodiment, the following information is considered when preparing the above-mentioned lookup table and/or the polynomials. When the number T decreases, the first multiplier KP is decreased (so as to decrease the influence on the driving voltage U imposed by the velocity V), or the second multiplier KD is increased (so as to increase the influence on the driving voltage U by the acceleration A). When the velocity V increases, the first multiplier KP is decreased (so as to decrease the influence on the driving voltage U by the velocity V), or the second multiplier KD is increased (so as to increase the influence on the driving voltage U by the acceleration A). It is also noted that the above description is for illustration purpose only and should not be limiting when preparing the lookup table and/or the equations.

Various implementations are available for realizing the track sensor 330, the velocity sensor 340 and the acceleration sensor 350. In the track sensor 330, the remaining tracks information (i.e. the number T) could be obtained by monitoring the tracking signals generated by the pickup head during the long seeking operation, or by reading the track-related data previously recorded on the optical disc (e.g. the Q code for a CD, the sector ID for a DVD, or the ATIP (Absolute Time in Pre-groove) for a blank disc). In the velocity sensor 340, the velocity information (i.e. the velocity V) could be obtained by differentiating the number T with respect to time, or by measuring the frequency of the tracking signals. In the acceleration sensor 350, the acceleration information (i.e. the acceleration A) could be obtained by differentiating the velocity V with respect to time, or by measuring the frequency variation of the tracking signals over time.

Figure 4:
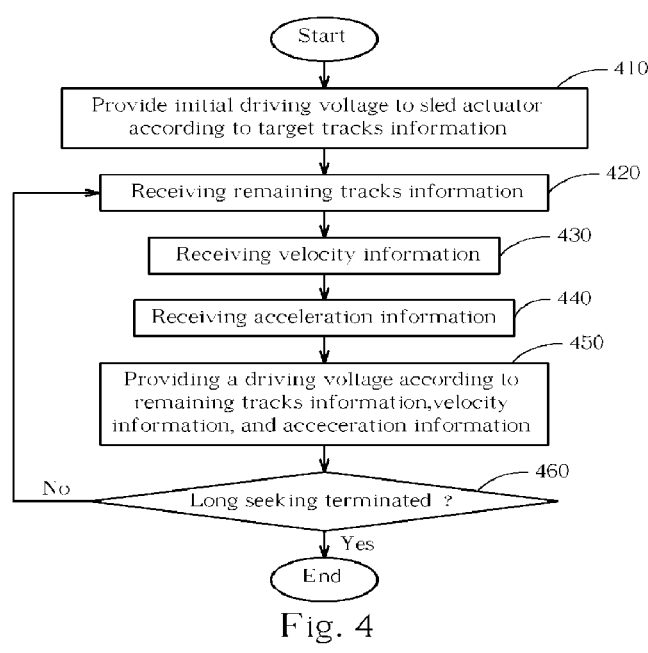
FIG. 4 is a flowchart of the method for long seeking control of an optical disc drive according to the embodiment.

FIG. 4 illustrates a flowchart of the method for long seeking control of an optical disc drive according to the embodiment. Hereby the optical disc drive includes a sled actuator, a pickup head movably installed on the sled actuator for accessing data stored in an optical disc, and a controller for controlling the sled actuator to move the pickup head in long seeking process. The method is as follows:

Step 410: Providing an initial driving voltage $U_0$ to the sled actuator according to the target tracks information.

Step 420: Receiving remaining tracks information (indicating a number, T, of tracks remained to be crossed by the actuator and/or the pickup head).

Step 430: Receiving velocity information (indicating a velocity V of the sled actuator and/or the pickup head).

Step 440: Receiving acceleration information (indicating an acceleration A of the sled actuator and/or the pickup head).

Step 450: Providing a driving voltage U to the sled actuator according to the remaining tracks information, the velocity information, and the acceleration information in order to control the velocity of the pickup head.

Step 460: See whether the long seeking is terminated. If yes, end the process, and if no, go to Step 420.

In FIG. 4, Step 420, Step 430, Step 440 could be performed by a track sensor, a velocity sensor, and an acceleration sensor respectively. It is noted that the sequence in this embodiment for performing these three steps is not limiting, and people skilled in this field would easily appreciate that other sequences are also regarded as inherent in this embodiment. Moreover in Step 450, equation 1 could be used for determining the driving voltage U according to the remaining tracks information, the velocity information, and the acceleration information. Further, Step 450 could include several sub-steps such as decreasing the first multiplier KP and/or increasing the second multiplier KD when the number T decreases, and decreasing the first multiplier KP and/or increasing the second multiplier KD when the velocity V increases, and then calculating the driving voltage U according to the equation 1. In such a manner, adaptive PD control can be realized.

In contrast to the prior art, the embodiment according to the present invention controls the sled actuator by adaptive PD control in long seeking process. So even in different optical disc drives, the control can be precisely performed. Furthermore, the parameters used in adaptive PD control vary adaptively, so the control of the whole long seeking control system could be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling long seeking operation in an optical disc drive, the optical disc drive comprising a sled actuator, a pickup head installed on the sled actuator for accessing data on an optical disc, and a controller for controlling the sled actuator to move together with the pickup head, the method comprising:
   (a) receiving remaining tracks information indicating a number of tracks remained to be crossed by the sled actuator and/or the pickup head;
   (b) receiving velocity information indicating a velocity of the sled actuator and/or the pickup head;
   (c) receiving acceleration information indicating an acceleration of the sled actuator and/or the pickup head; and
   (d) driving the sled actuator to move according to the remaining tracks information, the velocity information, and the acceleration information;
   wherein in step (d), the controller outputs a driving voltage to control a movement of the sled actuator and/or the pickup head; the driving voltage is a function of the velocity and the acceleration of the sled actuator and/or the pickup head; and the driving voltage is influenced by a product of the velocity of the sled actuator and/or the pickup head and a first multiplier.

2. The method of claim 1 wherein the first multiplier is a variable determined by the number of tracks remained to be crossed and the velocity of the sled actuator and/or the pickup head.

3. The method of claim 1 further comprising:
   (e) decreasing the first multiplier with the controller when the number of tracks remained to be crossed decreases.

4. The method of claim 1 further comprising:
   (f) decreasing the first multiplier with the controller when the velocity of the sled actuator and/or the pickup head increases.

5. A method for controlling long seeking operation in an optical disc drive, the optical disc drive comprising a sled actuator, a pickup head installed on the sled actuator for accessing data on an optical disc, and a controller for controlling the sled actuator to move together with the pickup head, the method comprising:
   (a) receiving remaining tracks information indicating a number of tracks remained to be crossed by the sled actuator and/or the pickup head;
   (b) receiving velocity information indicating a velocity of the sled actuator and/or the pickup head;
   (c) receiving acceleration information indicating an acceleration of the sled actuator and/or the pickup head; and
   (d) driving the sled actuator to move according to the remaining tracks information, the velocity information, and the acceleration information;
   wherein in step (d), the controller outputs a driving voltage to control a movement of the sled actuator and/or the pickup head; the driving voltage is a function of the velocity and the acceleration of the sled actuator and/or the pickup head; and the driving voltage is influenced by a product of the acceleration of the sled actuator and/or the pickup head and a second multiplier.

6. The method of claim 5 wherein the second multiplier is a variable determined by the number of tracks remained to be crossed and the velocity of the sled actuator and/or the pickup head.

7. The method of claim 5 further comprising:
   (g) increasing the second multiplier by the controller when the number of tracks remained to be crossed decreases.

8. The method of claim 5 further comprising:
   (h) decreasing the second multiplier by the controller when the velocity of the sled actuator and/or the pickup head increases.

9. A long seeking control system in an optical disc drive, the optical disc drive comprising a sled actuator, a pickup head installed on the sled actuator for accessing data on an optical disc, and a controller for controlling the movement of the sled actuator together with the pickup head, the long seeking control system comprising:
   a track sensor coupled to the controller for providing remaining tracks information indicating a number of tracks remained to be crossed by the sled actuator and/or the pickup head;
   a velocity sensor coupled to the controller for providing velocity information indicating a velocity of the sled actuator and/or the pickup head; and
   an acceleration sensor coupled to the controller for providing acceleration information indicating an acceleration of the sled actuator and/or the pickup head;
   wherein the controller controls a movement of the sled actuator and/or the pickup head according to the remaining tracks information, the velocity information, and the acceleration information; the controller outputs a driving voltage to control the movement of the sled actuator and/or the pickup head; the driving voltage is a function of the velocity and the acceleration of the sled actuator and/or the pickup head; the driving voltage is influenced by a product of the velocity of the sled actuator and/or the pickup head and a first multiplier, and the first multiplier is a variable determined by the number of tracks remained to be crossed and the velocity of the sled actuator and/or the pickup head.

10. The system of claim 9 wherein the controller decreases the first multiplier when the number of tracks remained to be crossed decreases.

11. The system of claim 9 wherein the controller decreases the first multiplier when the velocity of the sled actuator and/or the pickup head increases.

12. A long seeking control system in an optical disc drive, the optical disc drive comprising a sled actuator, a pickup head installed on the sled actuator for accessing data on an optical disc, and a controller for controlling the movement of the sled actuator together with the pickup head, the long seeking control system comprising:

a track sensor coupled to the controller for providing remaining tracks information indicating a number of tracks remained to be crossed by the sled actuator and/or the pickup head;

a velocity sensor coupled to the controller for providing velocity information indicating a velocity of the sled actuator and/or the pickup head; and an acceleration sensor coupled to the controller for providing acceleration information indicating an acceleration of the sled actuator and/or the pickup head;

wherein the controller controls a movement of the sled actuator and/or the pickup head according to the remaining tracks information, the velocity information, and the acceleration information; the controller outputs a driving voltage to control the movement of the sled actuator and/or the pickup head; the driving voltage is a function of the velocity and the acceleration of the sled actuator and/or the pickup head; the driving voltage is influenced by a product of the acceleration of the sled actuator and/or the pickup head a second multiplier, and the second multiplier is a variable determined by the number of tracks remained to be crossed and the velocity of the sled actuator and/or the pickup head.

13. The system of claim 12 wherein the controller increases the second multiplier when the number of tracks remained to be crossed decreases.

14. The system of claim 12 wherein the controller decreases the second multiplier when the velocity of the sled actuator and/or the pickup head increases.

* * * * *